(12) United States Patent
Stewart

(10) Patent No.: US 7,717,252 B2
(45) Date of Patent: May 18, 2010

(54) CARGO POWER DRIVE UNIT WITH UNIFORM BI-DIRECTIONAL DRIVE TRACTION

(75) Inventor: Ian Roe Stewart, Diamond Bar, CA (US)

(73) Assignee: Goodrich Corporation, Charlotte, NC (US)

( * ) Notice: Subject to any disclaimer, the term of this patent is extended or adjusted under 35 U.S.C. 154(b) by 220 days.

(21) Appl. No.: 11/939,808

(22) Filed: Nov. 14, 2007

(65) Prior Publication Data

US 2009/0120767 A1  May 14, 2009

(51) Int. Cl.
*B65G 13/12* (2006.01)
(52) U.S. Cl. .................... 198/782; 193/35 SS
(58) Field of Classification Search ............. 198/782; 193/35 SS
See application file for complete search history.

(56) References Cited

U.S. PATENT DOCUMENTS

| | | | |
|---|---|---|---|
| 3,690,440 A * | 9/1972 | Macpherson ............. | 198/782 |
| 3,899,070 A * | 8/1975 | Lang ........................ | 198/782 |
| 3,978,975 A | 9/1976 | Herbes et al. | |
| 4,134,487 A * | 1/1979 | Veragen ................... | 198/782 |
| 4,589,542 A | 5/1986 | Steadman | |
| 5,101,962 A | 4/1992 | Pritchard | |
| 5,547,069 A | 8/1996 | Pritchard | |
| 5,568,858 A | 10/1996 | Thompson | |
| 5,716,028 A | 2/1998 | Evans | |
| 6,135,269 A * | 10/2000 | Huber et al. ............. | 198/782 |
| 6,340,085 B1 | 1/2002 | Huber | |
| 6,557,800 B2 | 5/2003 | Medina et al. | |
| 6,834,758 B2 | 12/2004 | Nguyen et al. | |
| 7,014,038 B2 | 3/2006 | Leingang et al. | |
| 2007/0057120 A1 | 3/2007 | McConnell | |

FOREIGN PATENT DOCUMENTS

| | | |
|---|---|---|
| CA | 2 373 692 A1 | 8/2003 |
| DE | 39 19 613 A1 | 12/1990 |
| DE | 691 07 605 T2 | 6/1995 |
| DE | 195 39 627 B4 | 5/2005 |
| DE | 696 35 593 T2 | 7/2006 |

OTHER PUBLICATIONS

English translation of Official Action from German Patent and Trademark Office (Appln. No. DE 10 2008 052 873.0-22) dated Nov. 3, 2009.

* cited by examiner

*Primary Examiner*—James R Bidwell
(74) *Attorney, Agent, or Firm*—Womble Carlyle Sandridge & Rice, PLLC

(57) ABSTRACT

A power drive unit for propelling cargo containers and pallets in a desired direction over a plurality of cargo deck roller elements includes an elongated yoke having a pivot end and an opposite end. The pivot end is pivotally connected to a deck support structure. A drive roller is rotatably mounted to the yoke. At least one resilient member is disposed between the opposite end of the yoke and the support portion of the deck structure. A drive motor coupled to the drive roller selectively rotates the drive roller in two opposed directions. A reaction member connected to the drive motor is at least partially movably engaged with the deck support structure to permit at least some pivotal movement of the yoke, and to substantially prevent rotation of the drive motor relative to the yoke.

18 Claims, 10 Drawing Sheets

CARGO POWER DRIVE UNIT WITH UNIFORM BI-DIRECTIONAL DRIVE TRACTION

FIELD OF THE INVENTION

The invention relates to onboard cargo handling systems for aircraft, and more particularly relates to a power drive unit that is capable of maintaining driving, braking, and holding contact with an irregular underside of a cargo container or pallet, and that is capable of providing substantially equal driving traction in two opposed directions.

BACKGROUND

Items that are shipped by air typically are loaded first onto specially configured pallets or into specially configured containers. In the airfreight industry, these various pallets and containers commonly are referred to as Unit Load Devices ("ULDs"). ULDs are available in various sizes, shapes and capacities.

A ULD typically is loaded with cargo at a location other than the immediate vicinity of an aircraft. Once a ULD is loaded with cargo items, the ULD is weighed, transferred to the aircraft, and is loaded onto an aircraft through a doorway or hatch using a conveyor ramp, scissor lift, or the like. Once inside the aircraft, a ULD is moved within the cargo compartment to its final stowage position. Multiple ULDs are brought onboard the aircraft, and each is placed in its respective stowed position. Once the aircraft reaches its destination, the ULDs are unloaded from the aircraft in a manner that is the reverse of the loading procedure.

To facilitate movement of a ULD within an aircraft cargo compartment as the ULD is loaded, stowed, and unloaded, the deck of an aircraft cargo compartment typically includes a number of raised roller elements. These roller elements often include elongated roller trays that extend longitudinally along the length of the cargo deck, ball panel units, and the like. For example, roller trays typically include elongated rows of cylindrical rollers that extend in a fore and aft direction. Ball panel units include plates with upwardly protruding rotatable spherical balls. The ULDs sit atop these roller elements, and the roller elements facilitate rolling movement of the ULDs within the cargo compartment. Cargo decks also commonly are equipped with a plurality of power drive units (PDUs). PDUs are electrically powered rollers that can be selectively energized to propel or drive a ULD in a desired direction over a cargo deck's roller elements.

Generally, PDUs can be one of two basic types. A first type of PDU is secured to a cargo deck structure such that the powered drive roller can only rotate in fore and aft directions within a cargo hold. Such a "fixed" PDU typically is installed within a cargo roller tray such that the PDU's drive roller protrudes above a plane defined by the uppermost portions of adjacent roller elements when the drive roller is in an active position. The drive roller can be either an inflated tire or a rigid roller having an elastomeric rim. The rotating tire or roller contacts and grips the bottom of an overlying ULD such that the ULD is driven in a desired direction by traction between the roller and the underside of the ULD. Such stationary PDUs often are configured such that the drive roller can be selectively moved between an active raised position, and a retracted inactive or stowed position. The lifting of the drive roller from the retracted position can be actuated by springs, by an electrically powered lift mechanism, or the like. Such fixed PDU's typically are installed at cargo deck locations remote from an aircraft's cargo door, where a ULD's movement can be substantially limited to the fore and aft directions.

A second type of PDU is known as a "steerable PDU". In a typical steerable PDU, the drive roller is mounted to a rotatable frame or turntable that can be selectively oriented to align the drive roller in a desired direction within a cargo hold. Like the fixed PDUs described above, a steerable PDU can be configured to lift and retract the drive roller between its active raised position and its inactive retracted position. Steerable PDUs usually are installed at cargo deck locations that are proximate to an aircraft's cargo door, where a ULD may require movement in a direction other than the fore or aft directions as the ULD is being loaded and/or unloaded.

The bottom surfaces of ULDs can be irregular either due to their original construction or due to damage or deformation from prior use. Accordingly, when a ULD with an irregular bottom surface moves over an active PDU, the degree of contact between the unit's drive roller and the ULD can vary between full contact, partial contact, and zero contact. Once contact between the drive roller and the irregular surface of the ULD is lost or substantially reduced, the traction force between the drive roller and the ULD can be lost or reduced. When such lost or reduced traction occurs, the movement of the ULD within the cargo hold can be slowed or stopped, which detrimentally affects the cargo loading or unloading process. Though drive rollers that include resilient inflated tires can accommodate a certain amount of variation in contact between the drive roller and a ULD, non-inflated drive rollers are substantially less compliant to variations in the geometry of a ULD's undersurface.

One solution to this problem of lost or reduced contact and traction between a drive roller 20 and an irregular bottom surface 42 of a ULD 40 is illustrated in FIG. 1. In FIG. 1, a load-compliant PDU lift system 10 includes a drive roller 20 on a drive shaft 22 that is rotatably mounted to a yoke 12. As used herein, the term "load-compliant" means capable of automatically adapting to substantial variations or irregularities in the geometry of the undersurface of a ULD that contacts a PDU's drive roller. A first end 14 of the yoke 12 is pivotally mounted to a base 30 about a pivot axis 18. A second end 16 of the yoke 12 is vertically supported by one or more springs 50 disposed between the second end 16 and the base 30. Accordingly, as the spring is compressed by a vertical load "L" on drive roller 20, the second end 16 of the yoke 12 moves downward, the yoke 12 pivots downward, and the attached drive roller 20 also moves downward. Conversely, as the spring 50 pushes the second end 16 upward, the yoke 12 pivots upward, and the attached drive roller 20 also moves upward. Thus, the spring 50 permits the drive roller 20 to move up and down as necessary to maintain contact with an irregular bottom surface 42 of the ULD 40 as the ULD 40 is propelled by a traction force "$F_T$" applied by the roller 20. The spring (or springs) 50 is sized such that the vertical force applied by the spring 50 is sufficient to maintain frictional contact between the drive roller 20 and the bottom surface of the ULD under load L. The PDU lift system 10 shown in FIG. 1 can be adapted to mount to a stationary support, frame or base 30, or to mount to a steerable rotating support or frame. In addition, the PDU lift system 10 can be configured such that the drive roller 20 is selectively retractable.

Though the load-compliant PDU lift system 10 depicted in FIG. 1 may effectively maintain contact between the drive roller 20 and a ULD's irregular bottom surface 42, such a PDU lift system 10 has some shortcomings. As shown in FIG. 1, the drive roller 20 is selectively operable to be driven and rotate in a counterclockwise driving direction "I", and to be driven and rotate in an opposite clockwise driving direction "II". The drive shaft 22 and drive roller 20 are rotated by a drive motor (not shown in FIG. 1) that is affixed to the yoke. When the drive roller 20 is driven in a counterclockwise direction "I" under vertical load L, the drive roller 20 is subjected to a traction force $F_T$ (acting left to right in FIG. 1) due to the frictional drag between the drive roller 20 and the bottom surface 42 of the overlying ULD 40. Because the drive roller 20 is connected to a drive motor that is affixed to the yoke 12, this traction force $F_T$ results in a clockwise torque $T_{CW}$ acting on the yoke 12 that is equal to the traction force $F_T$ times the vertical distance "H" between the top of the drive roller 20 and the yoke pivot axis 18 ($T_{CW}=F_T \cdot H$). The clockwise torque $T_{CW}$ in turn forces the yoke 12 to rotate in a clockwise direction, thus compressing the spring 50, and causing the yoke 12 and drive roller 20 to move away from the ULD 40, and thus lessening the degree of contact between the drive roller 20 and the ULD's bottom surface 42. Because the traction force $F_T$ applied to the ULD 40 by the drive roller 20 is dependent upon the degree of contact between the drive roller 20 and the ULD 40, the additional compression of the spring 50 that results from the counterclockwise rotation of the drive roller 20 is detrimental to the magnitude of the driving force $F_T$ that is effectively applied to the ULD's bottom surface 42.

In contrast, when the drive roller 20 is driven in a clockwise direction "II", the direction of the frictional traction force $F_T$ is opposite from that shown in FIG. 1 (i.e. right to left in FIG. 1), and the resulting torque $T_{CCW}$ on the yoke 12 thus acts in a counterclockwise direction. This counterclockwise torque $T_{CCW}$ forces the yoke 12 to rotate in a counterclockwise direction about the yoke pivot axis 18 and to move upward, thereby increasing the degree of contact between the drive roller 20 and the underside 42 of the ULD 40. Because the degree of contact between the drive roller 20 and the ULD's underside 42 is increased by this movement, the effective traction force $F_T$ on the underside 42 of the ULD 40 is enhanced by the counterclockwise movement of the yoke 12. Thus, the load-compliant PDU 10 has a "strong" driving direction (left to right in FIG. 1), and a "weak" driving direction (right to left in FIG. 1). One possible solution to this problem is to provide larger and stiffer springs 50 to minimize the amount of additional spring compression that results from the traction force $F_T$. But such large springs 50 can undesirably increase the size and weight of the PDU 10.

Accordingly, there is a need for a load-compliant PDU, and more specifically, for a load-compliant PDU lift system that is equally effective in driving ULDs in two opposite directions.

SUMMARY

In one embodiment, the invention includes a power drive unit of a type that is mountable to a support portion of an aircraft deck structure. The power drive unit can include an elongated yoke having a pivot end and an opposite end, the pivot end being constructed and arranged for pivotal connection to the support portion of the aircraft deck structure along a pivot axis. The power drive unit further can include a drive roller rotatably mounted to the yoke about a roller axis, and at least one spring member constructed and arranged to be disposed between the opposite end of the yoke and the support portion of the aircraft deck structure. In addition, the power drive unit can include a drive motor coupled to the drive roller that is operable to selectively rotate the drive roller about the roller axis in two opposed directions. Furthermore, the invention can include a reaction member connected to the drive motor that is constructed and arranged to be at least partially movably engaged with the support portion of the aircraft deck structure to permit at least some pivotal movement between the yoke and the support portion of the aircraft deck structure, and to substantially prevent rotation of the drive motor relative to the yoke.

In addition, the invention includes a power drive unit having a drive roller powered by a drive motor, and means for supporting the drive roller proximate to a floor of a cargo deck. The power drive unit can further include a means for resiliently biasing the powered drive roller in an upward direction, and a means separate from the means for biasing for substantially preventing the transmission of torsional loads from the drive roller to the yoke.

The invention also includes a power drive unit for an aircraft having a cargo deck structure. The power drive unit can include a selectively rotatable frame constructed and arranged for mounting to the cargo deck structure, and an elongated yoke having a pivot end and an opposite end, the pivot end being pivotally connected to a first portion of the selectively rotatable frame along a pivot axis. The power drive unit also can include a drive roller rotatably mounted to the yoke, and a drive motor coupled to the drive roller that is engaged with the selectively rotatable frame in a manner that permits at least some pivoting movement of the yoke about the pivot axis, and that prevents substantial rotation of the drive motor relative to the yoke. In addition, the power drive unit can include at least one spring member disposed between the opposite end of the yoke and a second portion of the selectively rotatable frame.

These and other aspects of the invention will be apparent from a reading of the following detailed description together with the drawings.

DESCRIPTION

Figure 1:
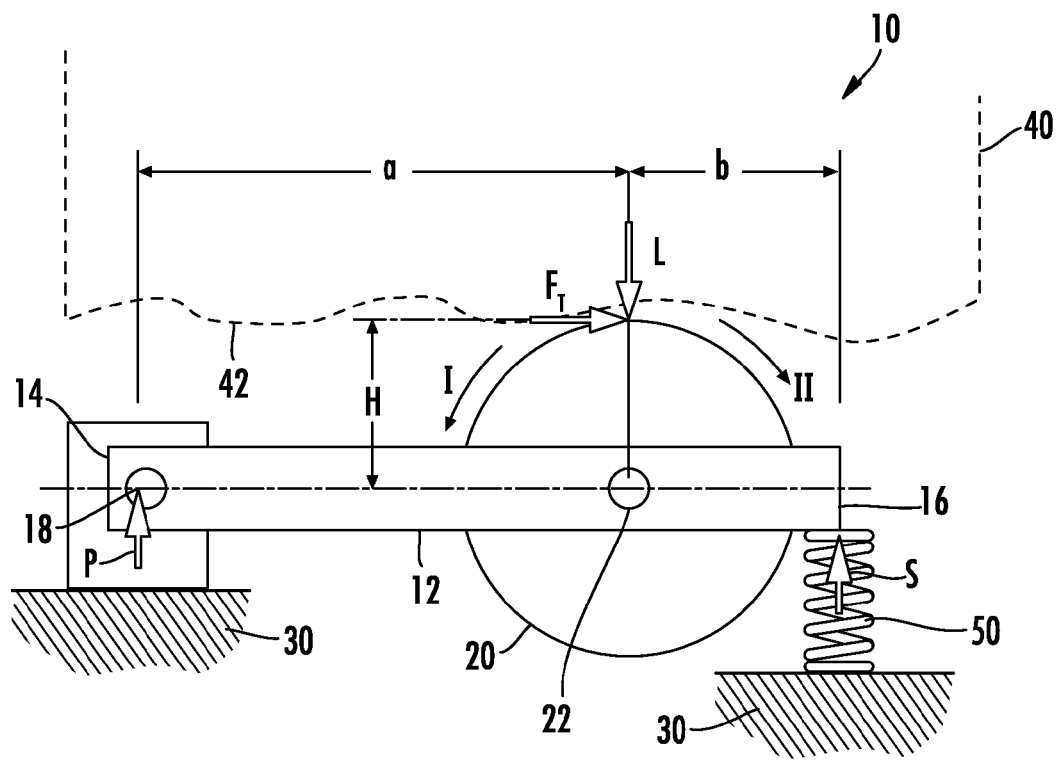
FIG. 1 is a schematic side view of a prior art load-compliant PDU.
Figure 2:
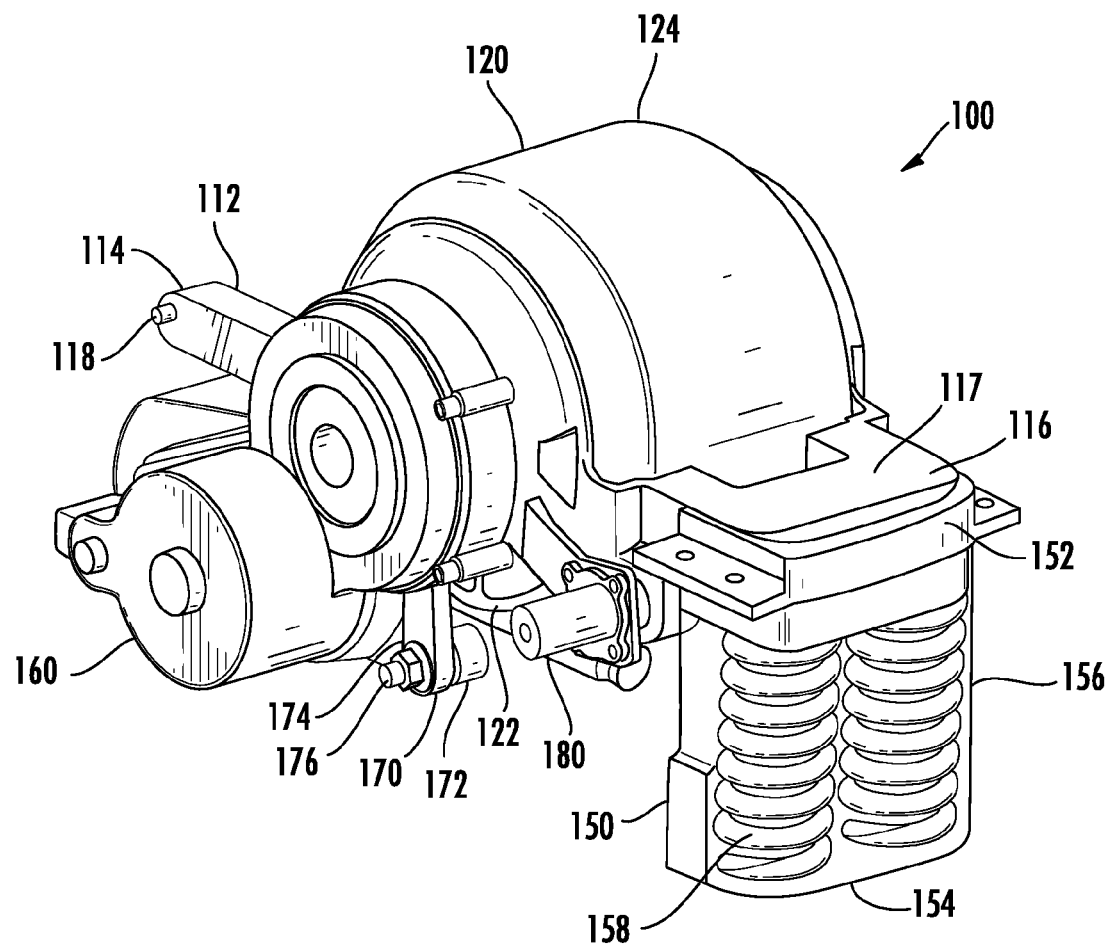
FIG. 2 is a perspective view of one embodiment a load-compliant lift system for a power drive unit according to the invention.
Figure 3A:
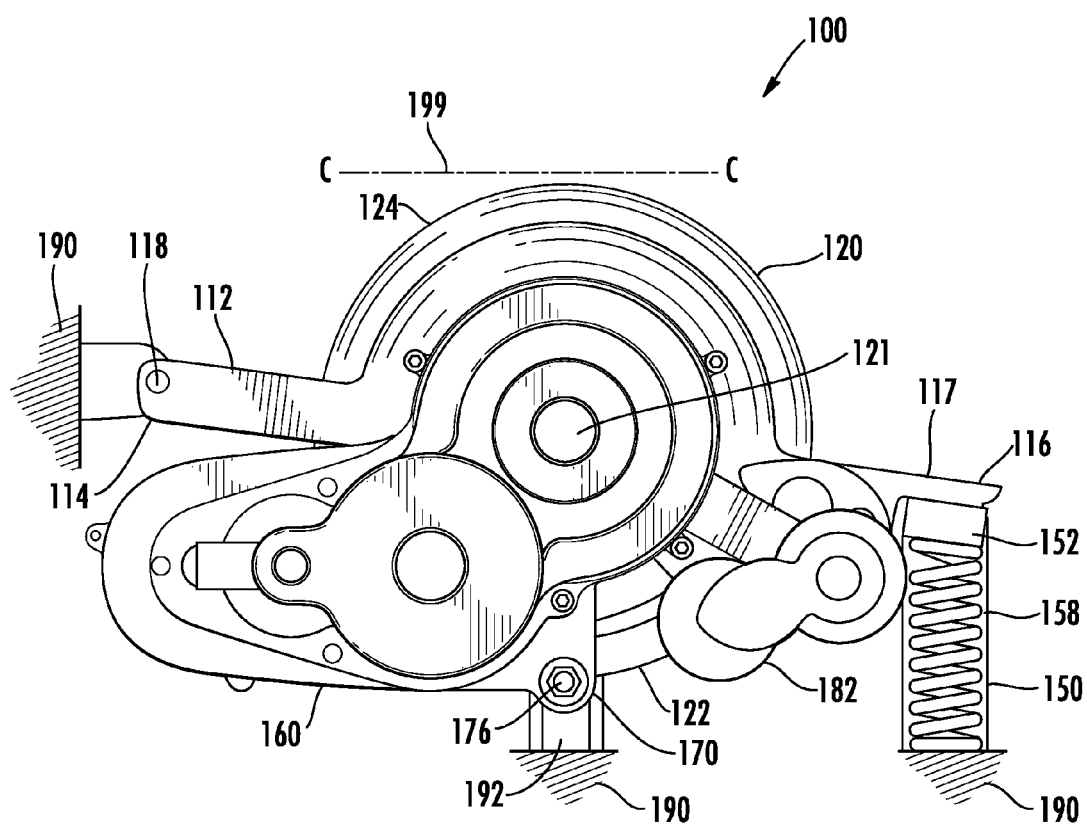
FIG. 3A is side elevation view of the load-compliant lift system shown in FIG. 2 with the drive roller in a retracted inactive position.
Figure 3B:
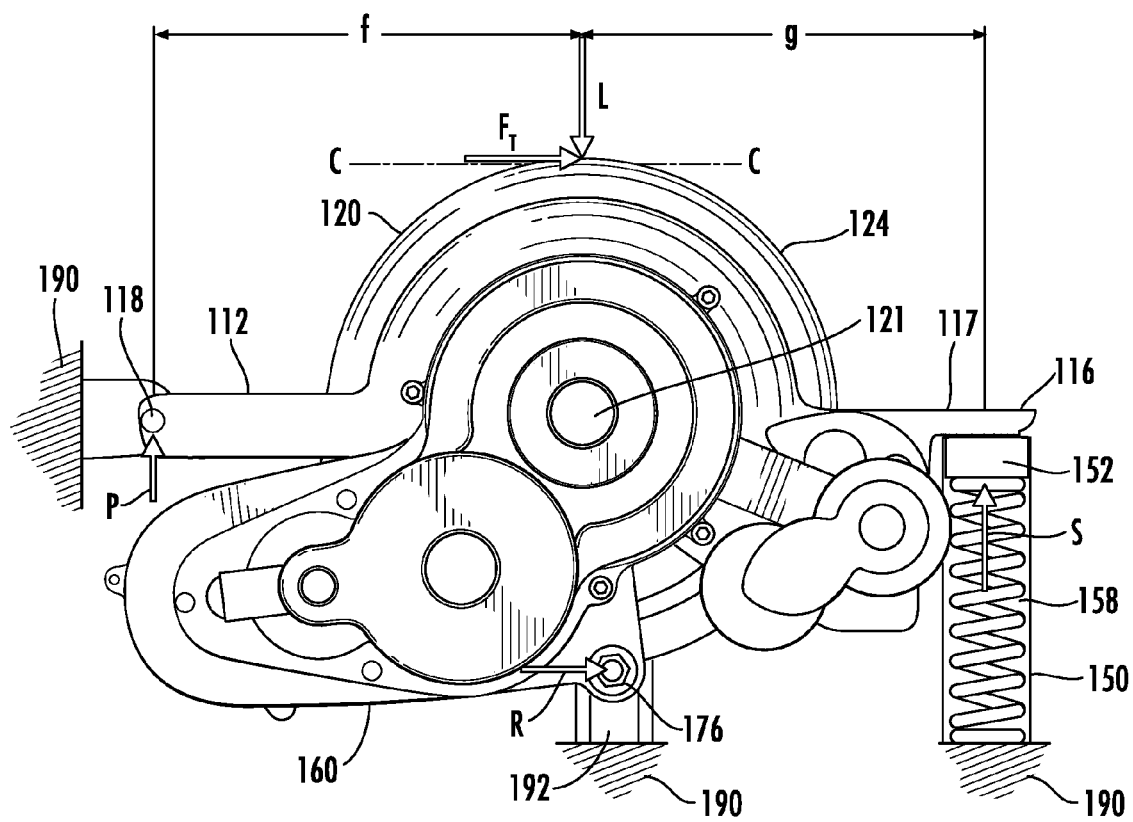
FIG. 3B is a side elevation view of the load-compliant lift system shown in FIGS. 2 and 3A with the drive roller in a raised active position.
Figure 4:
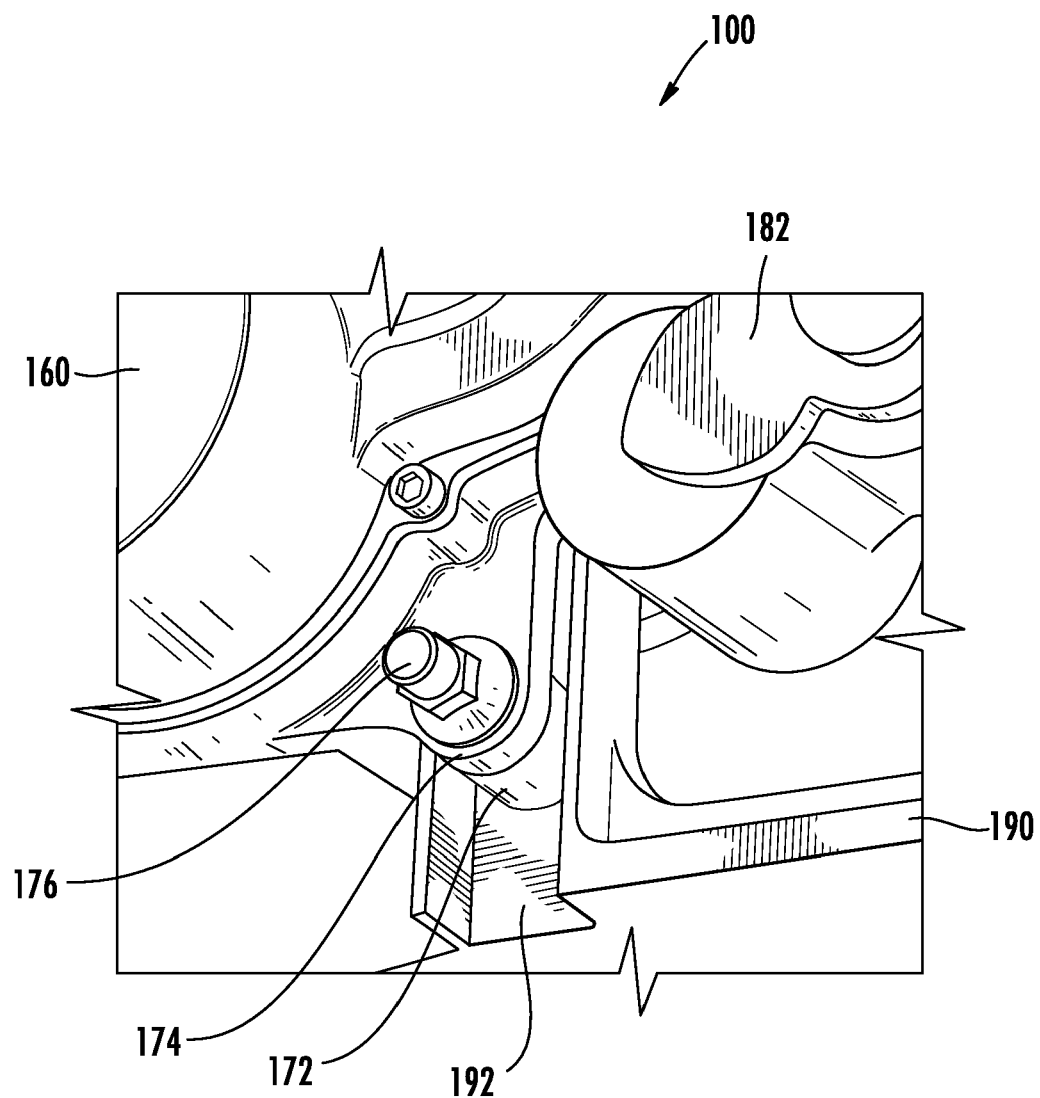
FIG. 4 is a detail perspective view of a reaction member portion of the load-compliant lift system shown in FIGS. 2-3B.

One embodiment of a load-compliant PDU with an improved lift system 100 according to the invention is shown in FIGS. 2-4. A shown in FIGS. 2-3B, the PDU lift system 100 can include an elongated yoke 112 having a first end 114 and an opposed second end 116. As shown in FIGS. 3A and 3B, the first end 114 can be pivotally connected to a base or frame 190 by one or more hinge pins 118. As shown in FIGS. 2 and 3A-3B, the second end 116 of the yoke 112 includes a bearing plate 117 having a bottom surface that engages a plunger 152 of a coil spring pack 150. In the embodiment shown, the spring pack 150 includes a housing 156 having a bottom 154, and a movable top or plunger 152. One or more coil springs 158 are vertically disposed within the housing 156 between the bottom 154 and plunger 152. As shown in FIGS. 3A and 3B, the bottom 154 of the spring pack housing 156 is fixed to base or frame 190, such as with bolts, or the like. The distance between the bottom 154 and plunger 152 and the length of the coil springs 158 can be selected to such that the springs are pre-compressed and preloaded when the plunger 152 is at an uppermost position.

As shown in FIGS. 3A and 3B, a drive roller 120 is affixed to a drive shaft 121 that is rotatably supported by the yoke 112. As shown in FIG. 2, the drive roller can include a substantially rigid hub 122 surrounded by a rubber or polymeric rim 124. Alternatively, the drive roller 120 can be an inflatable tire mounted on the hub 122. A drive motor 160 is coupled to the drive shaft 121, and is configured to selectively drive the drive shaft 121 and the connected drive roller 120 in two opposed rotating directions, such as fore and aft directions, for example. The drive motor 160 can be an electric motor, for example. In this embodiment and unlike previous PDUs, the drive motor 160 is not connected to the yoke 112. Thus, the drive roller 120 is incapable of applying torsional loads to the yoke 112 through the rotatably connected drive shaft 121 and unconnected drive motor 160. Because the drive motor 160 is not connected to the yoke, the drive motor 160 must otherwise be supported against rotation. For this purpose, a flange 174 affixed to the motor 160 rotatably supports a roller 172. As shown in FIG. 4, the roller 172 is received in a substantially vertical slot 192 in the base or frame 190 of the lift unit 100, which is fixed to or is an integral part of an aircraft structure that is beneath or forms a part of a cargo deck. As shown in FIG. 2, a lift post 180 can outwardly extend from the yoke 112. The springs 158 of PDU lift system 100 permit the yoke 112 to upwardly and downwardly pivot about pin 118 in response to variations in the underside surface of a ULD, thereby maintaining substantial contact between the drive roller 120 and an overlying ULD when the PDU is in an active arrangement and engaged with the ULD. The roller 172 on the drive motor 160 permits the drive shaft 121 and drive roller 120 to upwardly and downwardly move with the yoke 112, but substantially prevents rotation of the drive motor 160 relative to the base or frame 190.

The PDU lift system 100 is shown in a retracted, inactive position in FIG. 3A, in which the top of the drive roller 120 is positioned beneath the underside of an overlying ULD (indicated by line C-C). In this inactive position, the yoke 112 is downwardly pivoted about hinge pin 118 such that the coil springs 158 are further compressed by the bearing plate 117 and plunger 152. The yoke 112 can be moved to this retracted position and/or maintained in this position by a lift actuator 182 of a type known in the art. The lift actuator 182 can engage the lift post 180 shown in FIG. 2, and cause the yoke 112 and drive roller 120 to be positioned such that there is no substantial contact between the drive roller 120 and the underside of an overlying ULD (indicated by line C-C).

The PDU lift system 100 is shown in a raised, active position in FIG. 3B, in which the top of the drive roller 120 contacts the underside of an overlying ULD (again indicated by line C-C). In this active position, the yoke 112 and bearing plate 117 are pivoted upward about hinge pin 118 such that the coil springs 158 are extended, and thus compressed less than in their maximally compressed state shown in FIG. 3A. The compressed springs 158 can assist in moving the yoke 112 from the retracted position shown in FIG. 3A to the active position shown in FIG. 3B. The yoke 112 also can be released and/or moved to this active position by the lift actuator 182. In the active position, the top of the drive roller 120 is in substantial contact with the lower surface of an overlying ULD. In addition, the actively positioned drive roller 120 supports at least a portion "L" of the weight of an overlying ULD.

As discussed above and as best shown in FIG. 4, the roller 172 on the drive motor 160 is received in a slot 192 in the base or frame 190 of the lift unit 100, which is fixed to or is an integral part of an aircraft structure beneath or forming part of the cargo deck. The roller 172 and slot 192 cooperate to permit at least some vertical movement of the yoke 112 relative to the base or frame 190, and to substantially prevent rotation of the drive motor 160 relative to the yoke 112. The roller 172 and slot 192 also cooperate to react against any torque load on the drive roller 120 and connected drive shaft 121 caused by the traction force $F_T$ on the drive roller 120. Because the roller 172 is laterally constrained within the slot 192 and can move only vertically within the slot 192, the roller 172 is effective to provide a substantially horizontal reaction force "R" (shown in FIG. 3B) that acts to oppose clockwise rotation of the drive motor 160 induced by the traction force $F_T$ on the drive roller 120. Accordingly, unlike previous PDU designs, the traction force $F_T$ is borne by the drive motor 160 and base 190 rather than by the yoke 112. Therefore, unlike previous PDUs, the traction force $F_T$ does not cause downward movement of the yoke 112 and additional compression of the springs 158 when the drive roller 120 rotates in a counterclockwise direction against a lower surface of a ULD. Thus, the effective drive force on a ULD will not be substantially diminished by undesired further compression of the springs 158 as a result of clockwise downward rotation of the yoke 112 in response to a traction force $F_T$. As shown in FIG. 3B, the roller axle 176 can be positioned at a position that is coincident with the outer radius of the drive roller 120, such that the reaction force R is substantially equal to the traction force $F_T$.

A load compliant PDU lift system 100 like that described above can be configured to mount to either a fixed base 190, as described above, or can be configured to mount to a steerable base. Another embodiment of the invention that is mounted to a steerable base or frame is described below.

Figure 5:
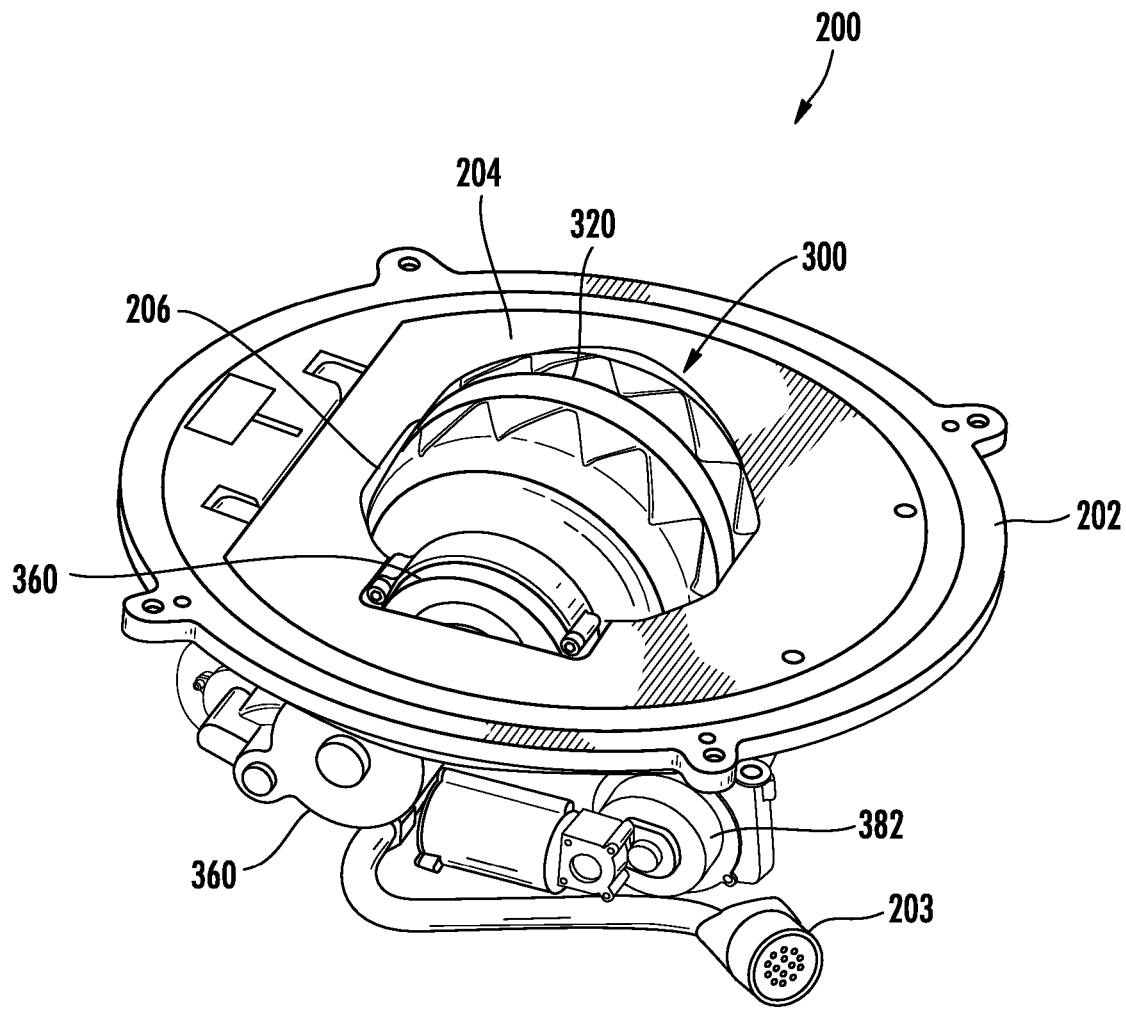
FIG. 5 is a top perspective view of one embodiment of a steerable load-compliant power drive unit according to the invention.
Figure 6:
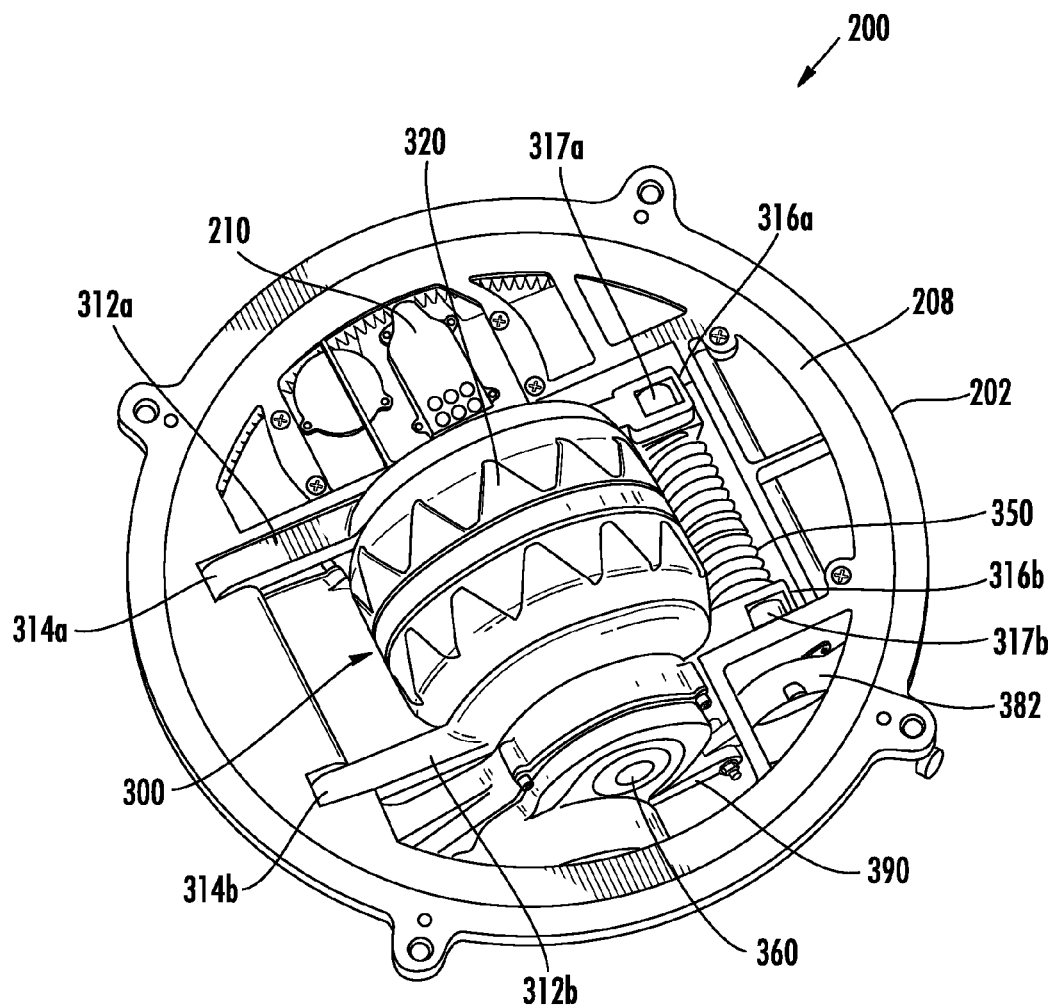
FIG. 6 is another top perspective view of the steerable load-compliant power drive unit shown in FIG. 5 with a top cover removed.
Figure 7:
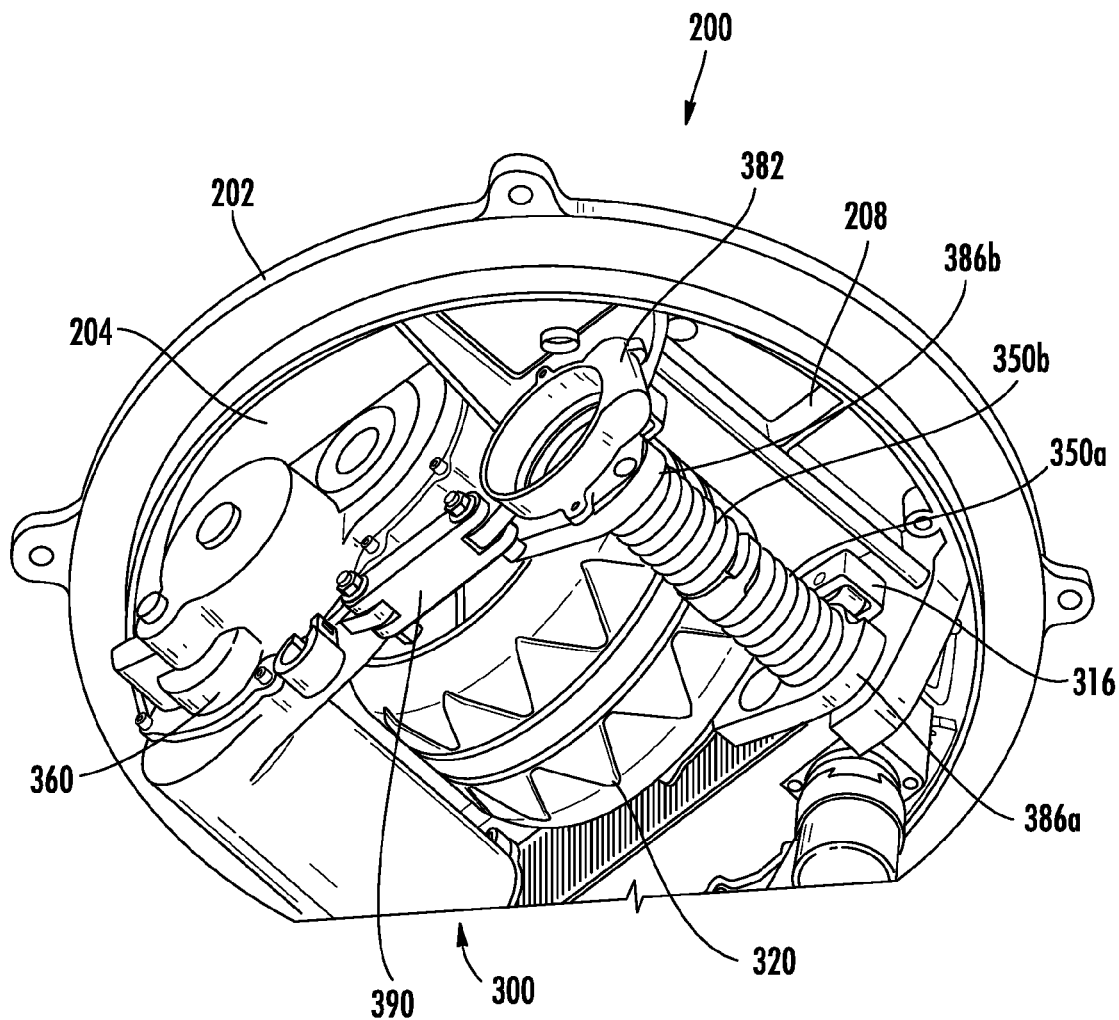
FIG. 7 is a bottom perspective view of the steerable load-compliant power drive unit shown in FIGS. 5 and 6.
Figure 8:
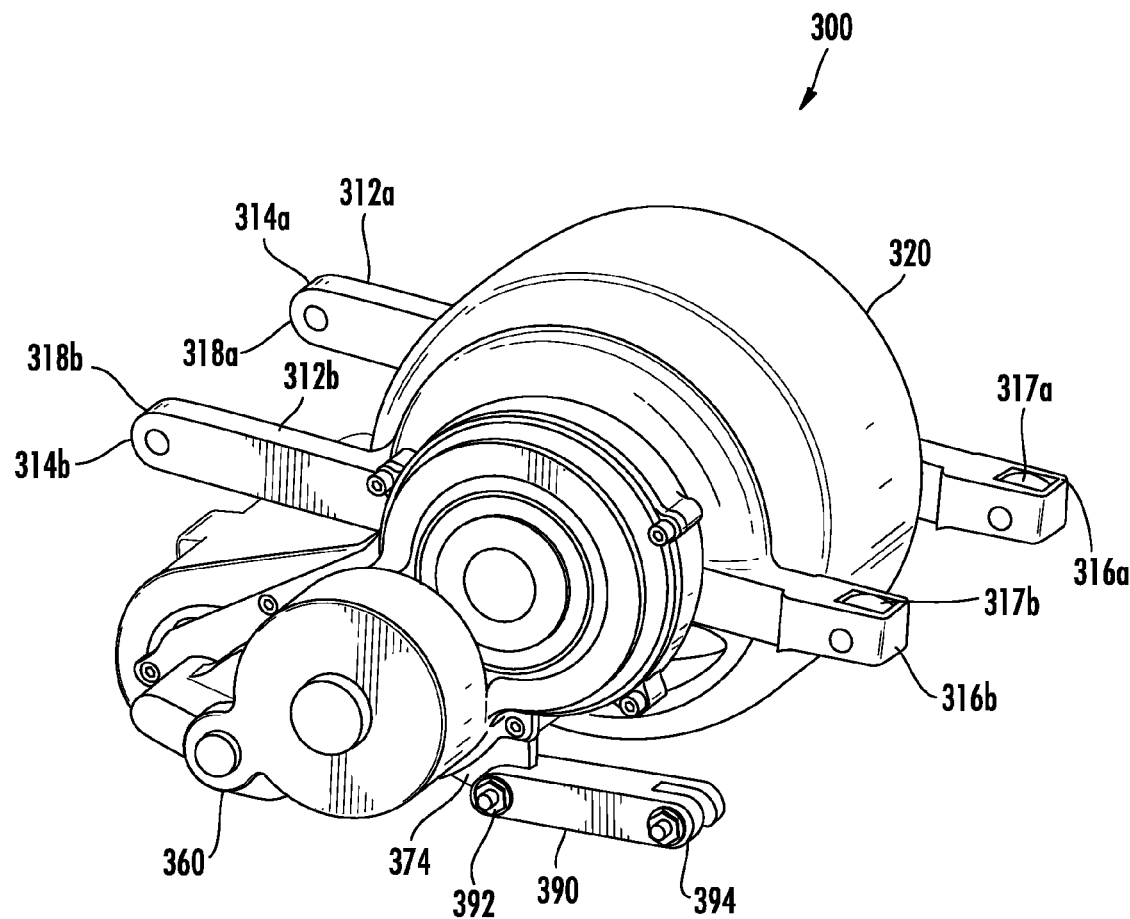
FIG. 8 is a side perspective view of a lift system portion of the steerable load-compliant power drive unit shown in FIGS. 5-7.
Figure 9:
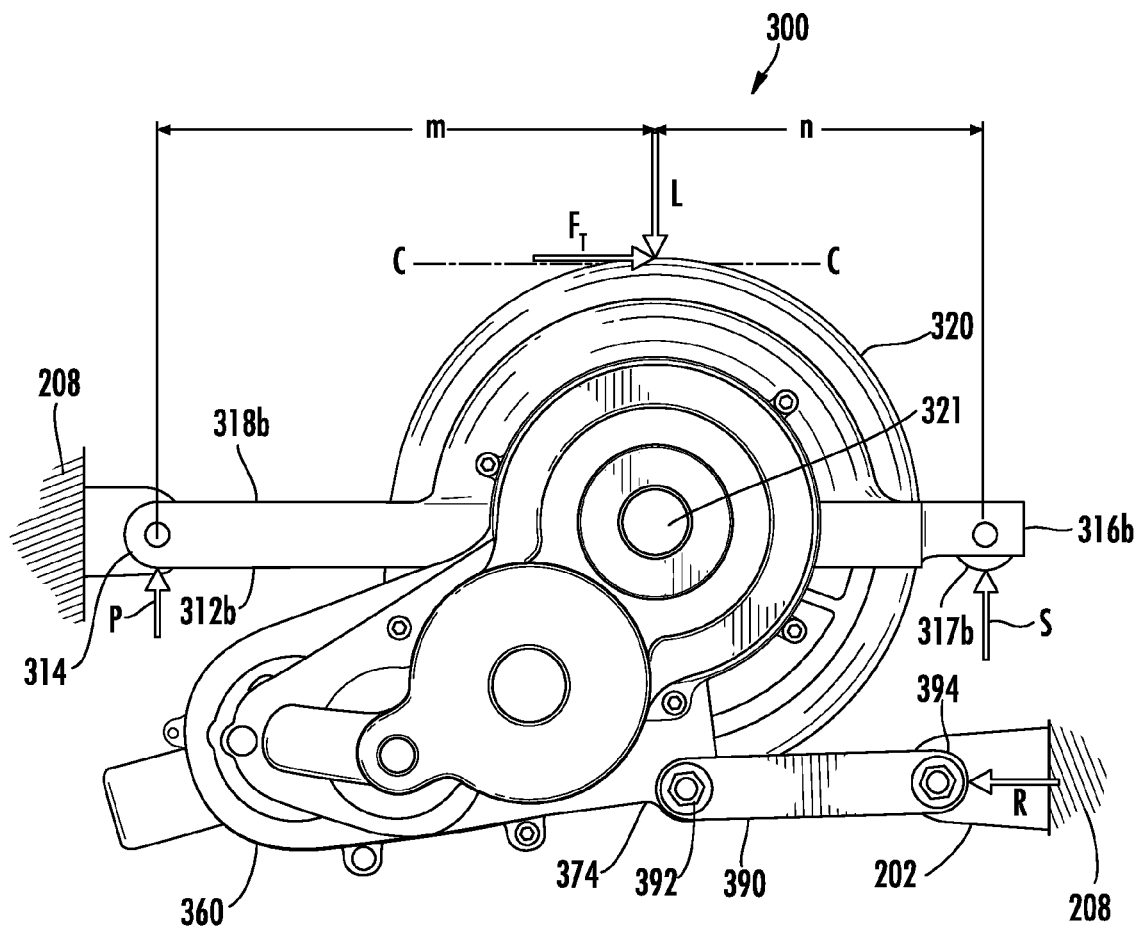
FIG. 9 is a side elevation view of the lift system shown in FIG. 8 with the drive roller in the raised active position.

As shown in FIGS. 5-7, a steerable, load-compliant PDU 200 includes a fixed frame or mounting ring 202. In the embodiment shown, the mounting ring 202 supports a rotatable inner frame or pivot plate 208. The pivot plate 208 can incorporate a removable cover 204, and includes an opening that permits a drive roller 320 to upwardly extend to a raised, active position. Like the fixed embodiment 100 described above and as shown in FIG. 5, the PDU 200 also includes a drive motor 360 and a lift actuator 382. The steerable load-compliant PDU 200 also can be provided with a power supply cable 203. As shown in FIG. 6, the pivot plate 208 supports a PDU lift mechanism 300 within the stationary outer frame 202. As shown in FIGS. 6, 8 and 9, the lift mechanism 300 can include a pair of opposed yoke members 312a, 312b respectively having first ends 314a, 314b, and second ends 316a, 316b. Alternatively, the lift mechanism 300 can include a one-piece yoke. The yoke members 312a, 312b can be mirror images of each other. In this embodiment, the first ends 314a, 314b of the yoke members 312a, 312b are pivotally connected to the rotatable inner frame 208 by one or more hinge pins, or the like. A drive roller 320 is rotatably mounted via a drive shaft 321 (shown in FIG. 9) between the opposed yoke members 312a, 312b, and is powered by a reversible drive motor 360 coupled to the drive shaft 321.

Now referring to FIGS. 6 and 7, the steerable PDU 200 can include a stationary support frame 202 and a rotatable frame 208. The stationary support frame 202 can be attached to an aircraft structure such that the frame 202 is fixed relative to a cargo deck of an aircraft. An actuator 210 can selectively rotate the rotatable frame 208 relative to the support frame 202, such that the drive roller 320 can be selectively oriented in a desired direction on the cargo deck. The PDU lift portion 300 of this PDU 200 can be substantially the same as the PDU lift system 100 described above, except as further described below.

As shown in FIG. 6, the second ends 316a, 316b of yokes 312a, 312b of lift system 300 respectively include rollers 317a, 317b. As shown in FIGS. 6 and 7, the rollers 317a, 317b respectively cooperate with first and second cams 386a, 386b which are rotatably mounted to the frame 208. A first coil spring 350a is interconnected between the frame 208 and the first cam 386a, and a second coil spring 350a is interconnected between the frame 208 and the second cam 386a. Selective tandem rotation of the cams 386a, 386b by lift actuator 382 cause the rollers 317a, 317b and the second ends of yokes 312a, 312b to be raised and lowered as desired. The coil springs 350a, 350b permit at least some resilient movement between the frame 208 and the cams 386a, 386b, thereby permitting the rollers 317a, 317b, the second ends of yokes 312a, 312b, and the drive roller 320 to move up or down in response to contact with an irregular bottom surface of a ULD. Accordingly, the coil springs 350a, 350b act to maintain frictional contact between the drive roller 320 and the bottom surface of an overlying ULD, even if different portions of the bottom surface vary in elevation relative to the cargo deck.

As shown in FIGS. 8 and 9, the PDU lift system 300 further includes a link 390 having a first end 392 and second end 394. As shown in FIG. 9, the first end 392 of the link 390 is pivotally connected to a flange 374 on the drive motor 360. The second end of the link 390 is pivotally connected to the frame 208. The link 390 is configured such that the link permits the yokes 312a, 312b to pivot upwardly and downwardly about hinge points 318a, 318b, while also preventing rotation of the drive motor 360 relative to the yokes 312a, 312b. Accordingly, as shown in FIG. 9, the link 390 is capable of providing a reaction force "R" that is substantially parallel to its longitudinal axis. In operation, when the drive roller 320 is engaged with an overlying ULD, the drive roller experiences a traction force $F_T$ that is parallel to a circumference of the roller 320. As indicated in FIG. 9, when the drive roller 320 is driven in a counterclockwise direction, the traction force $F_T$ acts in a left-to-right direction at the top of the roller 320. If the drive motor 360 was connected to one or both yokes 312a, 312b (as in previous designs) rather than to the frame 208 via link 320, the cams 386a, 386b and the coil springs 350a, 350b would necessarily react to at least a substantial portion of the resultant counterclockwise torque, the cams and springs would deflect, and the yokes 312a, 312b and drive roller 320 would move downward. Such downward movement would reduce or eliminate contact between the drive roller 320 and an overlying ULD. Such a reaction could substantially diminish the amount of traction force $F_T$ being applied to the overlying ULD.

The link 390, however, reacts against the traction force $F_T$ by resisting rotation of the drive motor 360. Because the drive roller 320 is incapable of imparting torsional loads to the yokes 312a, 312b through the drive shaft and connected drive motor 360, there is no unwanted resultant downward movement of the yokes 312a, 312b and drive roller 320 in response to a torsional traction load $F_T$ on the drive roller 320. Accordingly, the effective drive force $F_T$ between the drive roller 320 and a ULD will not be substantially diminished by undesired retraction of the drive roller in response to a traction force $F_T$ when the roller 320 is driven in a counterclockwise direction.

The above descriptions of various embodiments of the invention are intended to illustrate various aspects and features of the invention. Persons of ordinary skill in the art will understand that certain modifications can be made to the specifically described embodiments without departing from the invention. All such changes and modifications are intended to be within the scope of the appended claims.

What is claimed is:

1. A power drive unit of a type that is mountable to a support portion of an aircraft deck structure, the power drive unit comprising:
   (a) an elongated yoke having a pivot end and an opposite end, the pivot end being constructed and arranged for pivotal connection to the support portion of the aircraft deck structure along a pivot axis;
   (b) a drive roller rotatably mounted to the yoke about a roller axis;
   (c) at least one resilient member constructed and arranged to be disposed between the opposite end of the yoke and the support portion of the aircraft deck structure;
   (d) a drive motor coupled to the drive roller operable to selectively rotate the drive roller about the roller axis in two opposed directions; and
   (e) a reaction member connected to the drive motor, the reaction member being constructed and arranged to be at least partially movably engaged with the support portion of the aircraft deck structure to permit at least some pivotal movement between the yoke and the support portion of the aircraft deck structure, and to substantially prevent rotation of the drive motor relative to the yoke.

2. A power drive unit according to claim 1 wherein the reaction member is a link having a first end constructed and arranged to be pivotally connected to the support portion of the aircraft deck structure, and a second end pivotally connected to the drive motor.

3. A power drive unit according to claim 1 wherein the reaction member is a roller rotatably connected to the drive motor, and wherein the roller is constructed and arranged to be received in a substantially vertical slot in the support portion of the aircraft deck structure.

4. A power drive unit according to claim 1 wherein the support portion of the aircraft deck structure is configured to selectively rotate about a substantially vertical axis that is substantially transverse to a longitudinal axis of the yoke.

5. A power drive unit according to claim 1 wherein the support portion of the aircraft deck structure comprises a substantially rigid base connected to the aircraft deck structure.

6. A power drive unit according to claim 1 wherein the resilient member comprises a spring pack including a plurality of springs.

7. A power drive unit according to claim 6 wherein at least one of the plurality of springs is at least partially pre-loaded.

8. A power drive unit according to claim 1 and further comprising at least one lifting cam in contact with the free end of the yoke, wherein the resilient member is disposed between the lifting cam and the support.

9. A power drive unit comprising:
(a) a drive roller powered by a drive motor;
(b) means for supporting the drive roller proximate to a floor of a cargo deck;
(c) means for resiliently biasing the powered drive roller in an upward direction; and
(d) means separate from the means for biasing for substantially preventing the transmission of torsional loads from the drive roller to the means for supporting the drive roller.

10. A power drive unit according to claim 9 wherein the means for supporting the drive roller comprises at least one yoke having a pivot end pivotally connected to a vertically stationary base.

11. A power drive unit according to claim 10 wherein the base is selectively rotatable such that the driving direction of the drive roller can be selectively changed.

12. A power drive unit according to claim 9 wherein the means for resiliently biasing the powered drive roller in an upward direction comprises a spring pack comprising a plurality of springs.

13. A power drive unit according to claim 9 wherein the means for resiliently biasing the powered drive roller in an upward direction comprises at least one resiliently mounted lifting cam.

14. A power drive unit according to claim 9 wherein the drive roller is rotatably mounted to a pivoting yoke, and wherein the means for substantially preventing the transmission of torsional loads comprises a pivoting link disposed between the drive motor and a vertically stationary base.

15. A power drive unit according to claim 9 wherein the drive roller is rotatably mounted to a pivoting yoke, and wherein the means for substantially preventing the transmission of torsional loads comprises a roller connected to the drive motor that is constructed and arranged to be movably engaged with a substantially vertical slot in a vertically stationary base.

16. A power drive unit for an aircraft having a cargo deck structure, the power drive unit comprising:
(a) a selectively rotatable frame constructed and arranged for mounting to the cargo deck structure;
(b) an elongated yoke having a pivot end and an opposite end, the pivot end being pivotally connected to a first portion of the selectively rotatable frame along a pivot axis;
(c) a drive roller rotatably mounted to the yoke about a roller axis;
(d) a drive motor coupled to the drive roller, the drive motor being engaged with the selectively rotatable frame in a manner that permits at least some pivoting movement of the yoke about the pivot axis, and that prevents substantial rotation of the drive motor relative to the yoke; and
(e) at least one spring member constructed and arranged to be disposed between the opposite end of the yoke and a second portion of the selectively rotatable frame.

17. A power drive unit according to claim 16, wherein the drive motor is connected to the selectively rotatable frame by a link.

18. A power drive unit according to claim 16 wherein the drive motor includes a roller that is movably engaged with a portion of the selectively rotatable frame.

* * * * *